US010685825B2

(12) United States Patent
Harada

(10) Patent No.: US 10,685,825 B2
(45) Date of Patent: Jun. 16, 2020

(54) MASS SPECTROMETER

(71) Applicant: SHIMADZU CORPORATION, Kyoto-shi, Kyoto (JP)

(72) Inventor: Takahiro Harada, Kyoto (JP)

(73) Assignee: SHIMADZU CORPORATION, Kyoto-shi, Kyoto (JP)

( * ) Notice: Subject to any disclaimer, the term of this patent is extended or adjusted under 35 U.S.C. 154(b) by 0 days.

(21) Appl. No.: 16/094,236

(22) PCT Filed: Apr. 18, 2016

(86) PCT No.: PCT/JP2016/062287
§ 371 (c)(1),
(2) Date: Oct. 17, 2018

(87) PCT Pub. No.: WO2017/183086
PCT Pub. Date: Oct. 26, 2017

(65) Prior Publication Data
US 2019/0115200 A1 Apr. 18, 2019

(51) Int. Cl.
*H01J 49/16* (2006.01)
*G01N 27/62* (2006.01)
*H01J 49/04* (2006.01)

(52) U.S. Cl.
CPC ............ *H01J 49/164* (2013.01); *G01N 27/62* (2013.01); *H01J 49/0418* (2013.01)

(58) Field of Classification Search
CPC ..................................................... H01J 49/164
See application file for complete search history.

(56) References Cited

U.S. PATENT DOCUMENTS 5,965,884 A * 10/1999 Laiko .................... H01J 49/164 250/288
2009/0146053 A1* 6/2009 Setou .................. H01J 49/0413 250/281

(Continued)

FOREIGN PATENT DOCUMENTS

EP 2 022 076 A2 2/2009
JP 2007-257851 A 10/2007

(Continued)

OTHER PUBLICATIONS

International Preliminary Report on Patentability with a Translation of Written Opinion in International Application No. PCT/JP2016/062287, dated Oct. 23, 2018.

(Continued)

*Primary Examiner* — Eliza W Osenbaugh-Stewart
(74) *Attorney, Agent, or Firm* — Sughrue Mion, PLLC

(57) ABSTRACT

An aperture member including an opening having a predetermined shape and an image forming optical system having a short focal length are disposed at predetermined positions between a laser emitter and a sample, and a substantially square laser beam irradiation region is formed by reducing and forming an image of the opening shape on the sample. The aperture member and the image forming optical system are movable in an optical axis direction, and a size of substantially square laser beam irradiation region on the sample is variable. The size of the laser beam irradiation region is adjusted to a size of a unit attention region in an analysis target region on the sample, and a step width of scanning for moving the laser beam irradiation position is also adjusted to the size of the unit attention region.

5 Claims, 7 Drawing Sheets

(56) References Cited

U.S. PATENT DOCUMENTS

| | | | |
|---|---|---|---|
| 2009/0197295 | A1 | 8/2009 | Fournier et al. |
| 2011/0315874 | A1 | 12/2011 | Ikegami et al. |

FOREIGN PATENT DOCUMENTS

| | | | |
|---|---|---|---|
| JP | 2009-535631 | A | 10/2009 |
| WO | 2007/128751 | A2 | 11/2007 |
| WO | 2010/100675 | A1 | 9/2010 |

OTHER PUBLICATIONS

International Search Report in International Application No. PCT/JP2016/062287, dated Jun. 21, 2016.

Harada, et al., "Biological Tissue Analysis with Microscopic Mass Spectrometer", Shimadzu Review, Shimadzu Review Editorial Department, vol. 64, Nos. 3 and 4, 2007, pp. 139-146 (36 pages total).

"rapifleX™ MALDI Tissuetyper™", Bruker Inc., Internet <URL: https://www.bruker.com/jp/products/mass-spectrometry-and-separations/maldi-toftof/rapiflex-maldi-tissuetyper/overview.html> Search on Mar. 16, 2016 (4 pages total).

Jurchen, et al., "MALDI-MS Imaging of Features Smaller than the Size of the Laser Beam", Journal of the American Society for Mass Spectrometry, vol. 16, Issue 10, 2005, pp. 1654-1659.

* cited by examiner

Fig. 3(a) FOR SMALL UNIT ATTENTION REGION
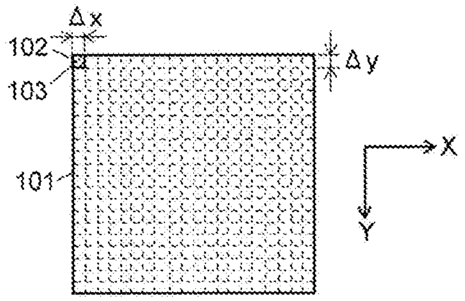
Fig. 3(b)
FOR LARGE UNIT ATTENTION REGION (THE CASE THAT LASER BEAM IRRADIATION REGION IS ALSO SMALL)
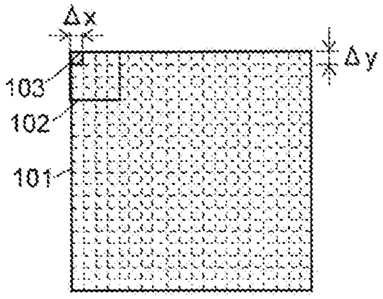
Fig. 3(c) FOR LARGE UNIT ATTENTION REGION (THE CASE THAT LASER BEAM IRRADIATION REGION IS ENLARGED)
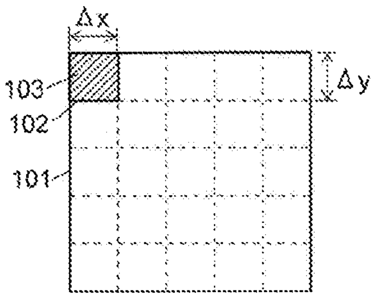
Fig. 4(a)
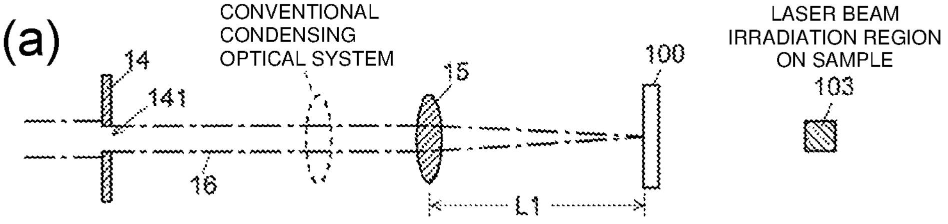
Fig. 4(b)
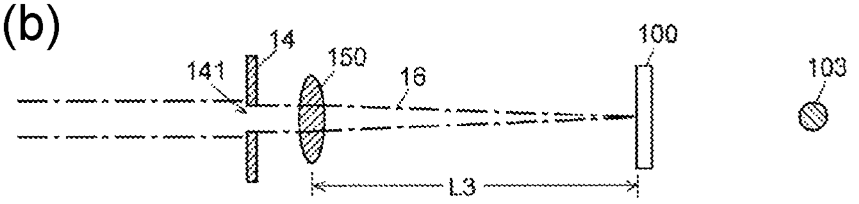
Fig. 4(c)
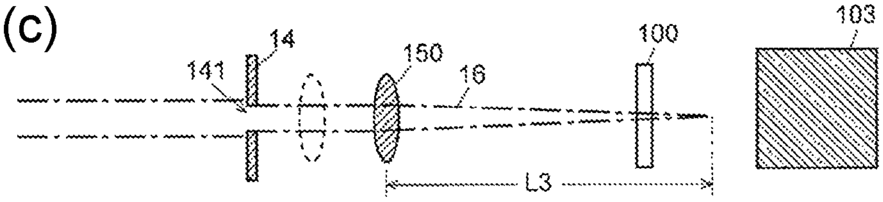

MASS SPECTROMETER

CROSS REFERENCE TO RELATED APPLICATIONS

This application is a National Stage of International Application No. PCT/JP2016/062287, filed on Apr. 18, 2016

TECHNICAL FIELD

The present invention relates to a mass spectrometer, and more particularly to a mass spectrometer including an ion source capable of irradiating a solid sample with a laser beam to desorb a substance in the sample to ionize the substance or to simultaneously perform the desorption and the ionization of the substance in the sample.

BACKGROUND ART

The mass spectrometry imaging method is a technique of examining a distribution of a substance having a specific mass by performing mass spectrometry on a plurality of measurement points (minute regions) in a two-dimensional region of a sample such as a biological tissue piece. Applications for drug discovery, biomarker exploration, and investigation of cause of various sicknesses and diseases are being studied in the mass spectrometry imaging method. A mass spectrometer that performs the mass spectrometry imaging method is generally called an imaging mass spectrometer (see Patent Documents 1 and 2 and Non-Patent Document 1). Usually, microscopic observation is performed first on some two-dimensional regions on the sample, and then an analysis target region is decided based on the microscopic observation image and the imaging mass spectrometry of the region is performed. Consequently, the imaging mass spectrometer is called a microscopic mass spectrometer or a mass microscope, and referred to as "imaging mass spectrometer" in the present description.

In the imaging mass spectrometer, an ion source in which a matrix assisted laser desorption ionization (MALDI) method is adopted is normally used. In the ion source in which the MALDI method is adopted, a surface of the sample is irradiated with a laser beam whose diameter is narrowed by a condensing optical system including a lens, and ions of the substance contained in the sample are generated at and around the region of the laser beam irradiation. The generated ions are extracted from the surface of the sample by action of an electric field, introduced to a mass spectrometer through an ion transport optical system or the like as needed, separated according to a mass-to-charge ratio, and detected. The substance in the sample is ionized in an atmospheric pressure atmosphere or a vacuum atmosphere.

In a typical imaging mass spectrometer, in producing a mass spectrometry image in a two-dimensional analysis target region having a predetermined shape on the sample, the mass spectrometry is repeated by irradiating the sample with the laser beam in a pulsed manner while a sample stage on which the sample is placed is moved with a predetermined step width in two orthogonal axes (X-axis, Y-axis) in the two-dimensional plane. At this time, the laser beam irradiation region on the sample surface normally has a substantially circular shape or a substantially elliptical shape. On the other hand, each pixel (pixel) on the mass spectrometry image produced based on a mass spectrometry result has a rectangular shape. For this reason, it is necessary to associate substantially circular or substantially elliptical laser beam irradiation region with the rectangular pixels on the mass spectrometric image.

FIGS. 8(*a*) to 8(*e*) are schematic diagrams illustrating an example of the association between substantially circular laser beam irradiation region (the minute region where the mass spectrometry is actually performed) and the rectangular pixel on the mass spectrometry image. As illustrated in FIG. 8(*a*), it is considered that the mass spectrometry is performed on each of rectangular unit attention regions 102 obtained by dividing a two-dimensional (in an X-Y plane) analysis target region 101 set on a sample 100 into a lattice shape. One unit attention region 102 corresponds to one pixel on the mass spectrometry image. Though, in practice, the analysis target region 101 need not have a rectangular shape, it is assumed here that the analysis target region 101 is also rectangular for the purpose of easy understanding.

<Scheme A>

In the example of FIG. 8(*b*), the irradiation diameter of the laser beans is set irrespective of the size of the unit attention region 102, that is, irrespective of the step width of the laser beans irradiation position, and the laser beam irradiation position is moved with a step width corresponding to the size of the unit attention region 102 while each unit attention regions 102 is irradiated with laser beans. In this case, in the analysis target region 101, a large portion of the analysis target region 101 is not irradiated with laser beam, which produces a non-ionized region 104. Consequently, use efficiency of the sample is low and the amount of generated ions is small, so that the high-sensitivity analysis cannot be performed. Additionally, the substance existing only in the region that is not irradiated with the laser beam is not reflected at all in the mass spectrometry result, so that there is a risk that an important substance is overlooked.

<Scheme B>

For example, in the imaging mass spectrometer disclosed in Patent Document 1, the irradiation diameter of the laser beam with which the sample is irradiated can be adjusted. In the example of FIG. 8(*c*), the irradiation diameter of the laser beam is adjusted according to the size of the unit attention region 102, that is, the step width of the laser beam irradiation position. Specifically the irradiation diameter of the laser beam is adjusted such that the size of the unit attention region 102 is substantially matched with the irradiation diameter of the laser beam, and the laser beam irradiation position is moved with the step width corresponding to the size of the unit attention region 102 while each unit attention region 102 is irradiated with the laser beam. Even in this case, a non-ionized region 104 inevitably remains at the four corners of each unit attention region 102.

<Scheme C>

In the example of FIG. 8(*d*), although the irradiation diameter of the laser beam is equal to that of the example in FIG. 8(*b*), the step width of the laser beam irradiation position is narrowed so as to match with the irradiation diameter of the laser beam, and a plurality of analyses are performed on different minute regions in one unit attention region 102 (see Non-Patent Document 2). The mass spectrometry results obtained in the different minute regions of one unit attention region 102 are integrated or averaged to calculate the mass spectrometry result for the unit attention region 102. In this case, unlike the scheme B, it is unnecessary to adjust the irradiation diameter of the laser beam, so that a mechanism that changes the irradiation diameter of the laser beam is not required. At the same time, because the number of analyses and the number of moving times of the irradiation position of the laser beam are increased as compared with the scheme B, there is a disadvantage that a total analysis time is prolonged. Even in this case, a non-ionized region 104 inevitably remains at the four corners of the rectangular region circumscribing substantially circular laser beam irradiation region.

<Scheme D>

In the example of FIG. 8(*e*), similarly to the scheme B, the irradiation diameter of the laser beam is increased and the laser beam irradiation position is moved with a predetermined step width smaller than the size of the unit attention region 102 (in this example, a step width of about a half of the size in the X-axis direction or the Y-axis direction of the unit attention region 102) (see Non-Patent Document 3). In the above schemes A to C, the laser beams with which the different laser beam irradiation positions are irradiated do not overlap each other. However, in the scheme D, the laser beams with which the laser beam irradiation positions adjacent to each other are irradiated overlap each other. As a result, the non-ionized region 104 is avoided except a periphery of the analysis target region 101. Thus, only a small part of the non-ionized region 104 remains along the periphery of the analysis target region 101, and the use efficiency of the sample is very close to 100%.

However, in the scheme D, because a laser beam irradiation region extends over adjacent unit attention regions 102, the association between the position of the unit attention region 102 and the mass spectrometry result becomes complicated. Additionally, the scheme D has the following problems.

The amount of substance existing in each laser beam irradiation region is finite. If, a mass spectrometry is performed by irradiating a certain region with a laser beam and then the same region is irradiated with another laser beam, the amount of ions generated considerably decreases. For this reason, when the laser beam irradiation regions partially overlap each other, the amount of ions generated corresponding to the subsequent laser beam irradiation becomes small.

FIG. 9 is a diagram illustrating an example of a relationship between every laser beam irradiation position and the shape of the region where the sufficient amount of ions is obtained. The laser beam irradiation position is moved from the unit attention region 102 located at the left uppermost position in the analysis target region 101 along the X-axis direction with the step width (the bold-line arrow in FIG. 9), the scanning returns to a left end when reaching the right end of the analysis target region 101, and the laser beam irradiation position is moved in the Y-axis direction with the step width. In this way, the scanning is performed such that the laser beam irradiation position is finally moved to the lower right end of the analysis target region 101. In this case, suppose no ion is generated in the region already irradiated with the laser beam, the area in which the ionization can be performed with sufficiently high efficiency in each laser beam irradiation region is not the same as illustrated in FIG. 9. Consequently, the sensitivity is relatively low at the central portion of the analysis target region 101 as compared with the peripheral portion. That is, even if a certain substance is uniformly distributed in the analysis target region 101, a nonuniformity occurs in that the signal intensity of the ions of the substance is higher in the periphery as compared with the central portion. The nonuniformity varies depending on the scanning direction or scanning order of the laser beam irradiation position.

CITATION LIST

Patent Literature

Patent Literature 1: JP 2007-257851A

Patent Literature 2: WO 2010/100675

Non-Patent Literature

Non-Patent Literature 1: Harada, et al., (eight others), "Biological Tissue Analysis with Microscopic Mass Spectrometer", Shimadzu Review, Shimadzu Review Editorial Department, Vol. 64, Nos. 3 and 4, 2007

Non-Patent Literature 2: "rapiflex X™ MALDI Tissuetyper™", Bruker Inc., [online], [Search on Mar. 16, 2016], Internet Non-Patent Literature 3: J. C. Jurchen, et al., (two others), "MALDI-MS Imaging of Features Smaller than the Size of the Laser Beam", Journal of the American Society for Mass Spectrometry, Vol. 16, Issue 10, 2005, pp. 1654-1659

SUMMARY OF INVENTION

Technical Problem

The present invention made in order to solve the above problems provides a mass spectrometer that can uniformly and efficiently analyze the substance in the analysis target region, easily perform the association between the position of each unit attention region in the analysis target region and the mass analysis result, and avoid the nonuniformity of the ion intensity depending on the position in the analysis target region.

Solution to Problem

In order to solve the above problem, one aspect of the present invention is a mass spectrometer including an ion source that irradiates a sample with a laser beam to ionize a substance in the sample existing in a laser beam irradiation region, and performing a mass spectrometry on ions generated by the ion source or ions derived from the ions generated by the ion source, the mass spectrometer further including;

a) a laser beam source that emits the laser beam;

b) a laser beam shaping unit that shapes the laser beam emitted from the laser beam source such that the sectional shape of the laser beam becomes a predetermined shape with which a plane can be completely tiled; and c) a position controller that controls a relative positional relationship between the sample and the laser beam such that the laser beam irradiation position on the sample moves, and control the relative positional relationship between the sample and the laser beam such that the complete plane tiling is achieved by the laser beam irradiation region while the sectional shape of the laser beam becomes the predetermined shape and the sample is irradiated with the laser beam.

In the mass spectrometer of the present invention, the ion source is normally an ion source in which the MALDI method or the LDI method is adopted. An ion source, such as a surface-assisted laser desorption ionization (SALDI) method, which irradiates the sample with the laser beam to directly ionize the substance in the sample (the case that the desorption and the ionization are substantially simultaneously generated), may be adopted. Additionally, an ion source that is used in an electrospray assisted laser desorption ionization (ELDI) method and laser ablation (LA)-ICPMS, in which the laser beam is used only in the desorption (vaporization) of the substance from the sample while the ionization is used by another technique, may be adopted.

As described above, in the conventional mass spectrometer in which the MALDI ion source or the like is used, the shape of the irradiation region of the laser beam with which the sample is irradiated has substantially circular shape or substantially elliptical shape. That is, the shape is normally similar to the sectional shape of the laser beam just after being emitted from the laser beam source. On the other hand, in the mass spectrometer of the present invention, the laser beam shaping unit makes the sectional shape of the laser beam with which the sample is irradiated into a predetermined shape with which a plane can be completely tiled. When the sample is irradiated with the laser beam in which the sectional shape of the laser beam is made into the predetermined shape by the laser beam shaping unit, the position controller scans either one of or both of the sample and the laser beam while controlling the relative positional relationship between the sample and the laser beam such that the plane is completely tiled by the laser beam irradiation regions, that is, such that the laser beam irradiation regions adjacent to each other on the sample do not overlap each other with no gap. Specifically, for example, the position controller calculates the movement distance, the moving direction, and the like of the sample stage on which the sample is placed or that holds the sample according to the shape and the size of the irradiation region of the laser beam with which the sample is irradiated, and moves the sample stage based on the calculated information, which allows the complete tiling.

The state in which the complete plane tiling is achieved on the laser beam irradiation region on the sample means the state in which, for example, when laser beam irradiation regions surround a laser beam irradiation region, a gap or an overlap does not exist between any two laser beam irradiation regions adjacent to each other. This does not mean, for example, the state in which the plane tiling is achieved by the laser beam irradiation region on the sample up to just inside of a boundary between the measurement target region set by the user on the sample and outside of the measurement target region. Normally, the plane tiling is achieved by the shape to a range slightly exceeding the boundary or in a range within the boundary. In the case that the size of the laser beam irradiation region is variable as described later, the size of the laser beam irradiation region may appropriately be changed so as to match with the shape of the specified measurement target region as much as possible while the plane tiling is achieved at and around of the boundary.

The predetermined shape by which the complete plane tiling can be achieved is generally known, and, for example, there are only three kinds of regular polygons: an equilateral triangle, a square, and a regular hexagon. It is known that an oblong (that is, a rectangle), a parallelogram, and a triangle are such graphic shapes, and the complete plane tiling can be achieved even in more complicated graphic shapes. However, when the position controller controls driving of the sample stage or the like such that the complete plane tiling is achieved by the laser beam irradiation region, necessity of rotation of the sample stage or the like complicates a driving mechanism, and it takes time to move the sample stage. When complicated movement in the biaxial direction of the X-axis and the Y-axis is required without rotation, it also takes time to move the sample stage. For example, when the shape of the laser beam irradiation region is formed into an extremely long and slender shape, spatial spread of ions generated by the laser beam irradiation becomes large, which leads to deterioration of ion collection efficiency and the like.

Thus, in the mass spectrometer of the present invention, preferably the laser beam shaping unit makes the sectional shape of the laser beam into a rectangular shape. Because the shape of a pixel on the mass spectrometry image is usually square, more preferably the laser beam shaping unit makes the sectional shape of the laser beam into a square shape having the same size in the X-axis direction and the Y-axis direction.

The laser beam shaping unit may include an aperture member in which an opening having a predetermined shape is formed, the aperture member being provided on an optical axis of the laser beam emitted from the laser beam source. The aperture member corresponds to a mask for forming a mask pattern projected onto a workpiece in a laser processing machine or the like.

The laser beam shaping unit may have a configuration in which an image forming optical system is disposed on an optical path between the aperture member and the sample to reduce and project the opening shape of the aperture member onto the sample. In the optical system, even if the opening shape is attempted to be reduced and projected to a size substantially equal to the size (spot diameter) of the laser beam irradiation region of the conventional apparatus, in the image forming optical system having the same numerical aperture as the conventional apparatus, the opening shape is not formed due to a diffraction limit, and the laser beam irradiation region becomes a substantially circular shape or a substantially elliptical shape similar to that of the conventional apparatus. Accordingly, the image forming optical system is disposed at a position closer to the sample than that of the conventional apparatus to increase the numerical aperture of the image formation, thereby decreasing the diffraction limit. A focal length of the image forming optical system is set according to a required reduction ratio, and the aperture member is disposed at a proper position for the image formation.

The size of the unit attention region on the sample corresponding to the pixel on the mass spectrometry image is variously set according to the size of the analysis target region, the spatial resolution, the analysis time, and the like. For this reason, desirably the size of the laser beam irradiation region can be changed according to the size of the unit attention region. The mass spectrometer may further include an irradiation beam size changer that changes the size of the laser beam with which the sample is irradiated.

For example, in the case where the laser beam shaping unit includes the aperture member and the image forming optical system as described above, the irradiation beam size changer may change the reduction ratio by moving the aperture member and the image forming optical system along the optical axis.

As described above, in the image forming optical system, in the case that an area of the laser beam irradiation region is reduced, it is necessary to shorten the distance between the image forming optical system and the sample in order to increase the numerical aperture of the image formation. However, in the mass spectrometer, it is necessary to dispose an electrode that forms an electric field to extract the ions generated from the sample by the laser beam irradiation from the vicinity of the sample or an ion transport pipe through which the ions are transport to a subsequent stage close to the sample, and sometimes the image forming optical system is hardly disposed close to the sample.

In the mass spectrometer according to the present invention, the laser beam shaping unit may make the sectional shape of the laser beam into a rectangular shape when the irradiation beam size changer changes the size of the laser beam with which the sample is irradiated to a larger size.

Specifically, not the image forming optical system having a focal length shorter than that of the condensing optical system in the conventional apparatus but the condensing optical system in the conventional apparatus is directly used, and the aperture member is disposed on the optical axis in the vicinity of the condensing optical system. In such the disposition, the positional relationship among the aperture member, the condensing optical system, and the sample and the focal length of the condensing optical system do not satisfy the condition that forms the opening shape of the aperture member on the sample. As a result, similarly to the conventional apparatus, the sample is irradiated with substantially circular or substantially elliptical laser beam having a very small diameter. This can be understood that the optical system in the conventional apparatus is the image forming optical system that forms a point light source at infinity, and the opening of the aperture member acts as only a "stop" in the optical system.

When the condensing optical system is moved from this state in the direction in which the condensing optical system approaches the sample, the laser beam is in a defocused state on the sample, the size of the laser beam irradiation region is enlarged, and a contour obstructed by the aperture member appears gradually. As a result, the sample is irradiated by the shape of the opening of the aperture member. With this configuration, the shape of the laser beam irradiation region becomes substantially circular or elliptical when the size of the laser beam irradiation region on the sample is enlarged, and the shape of the laser beam irradiation region can be formed into the shape of the opening of the aperture member when the size of the laser beam irradiation region on the sample is reduced.

The mass spectrometer of the present invention may further include a data processor that produces a graph of a mass spectrometry result or a mass spectrometry image with respect to a predetermined one-dimensional or two-dimensional analysis target region based on the mass spectrometry result obtained by mass spectrometry of ions, which are generated by irradiating the sample with the laser beam while the position controller controls the relative positional relationship between the sample and the irradiation laser beam.

Although the mass spectrometer of the present invention is not necessarily specialized for an imaging mass spectrometer, the mass spectrometer of the present invention is suitable for the imaging mass spectrometer because the substance existing in a predetermined two-dimensional analysis target region on a sample can be detected without omission.

Advantageous Effects of Invention

According to the mass spectrometer of the present invention, the entire area of a two-dimensional analysis target region can uniformly be irradiated with the laser beam for the purpose of the ionization, and the laser beam irradiation of the overlapping region where almost no analysis substance is left because the mass spectrometry is already performed can be avoided. Consequently, a high-sensitivity analysis can be performed by fully using the sample, and detection omission and overlooking of the substance that exists only locally can be avoided. The shape of the unit attention region on the sample is matched with the shape of the laser beam irradiation region such that the laser beam irradiation region does not extend over the plurality of unit attention regions, so that the association between the actual laser beam irradiation region and the unit attention regions becomes clear. Consequently, the mass spectrometry image can easily be produced, and nonuniformity of the ion intensity depending on the position in the analysis target region can also be avoided.

BRIEF DESCRIPTION OF DRAWINGS

FIGS. 3(*a*) to 3(*c*) are schematic diagrams illustrating a relationship between a unit attention region and a laser beam irradiation region in an analysis target region in the imaging mass spectrometer of the first embodiment.

FIGS. 4(*a*) to 4(*c*) are schematic diagrams illustrating a laser optical system of an ion source in an imaging mass spectrometer according to a second embodiment of the present invention.

DESCRIPTION OF EMBODIMENTS

First Embodiment

An imaging mass spectrometer according to a first embodiment of the present invention will be described below with reference to the accompanying drawings.

Figure 1:
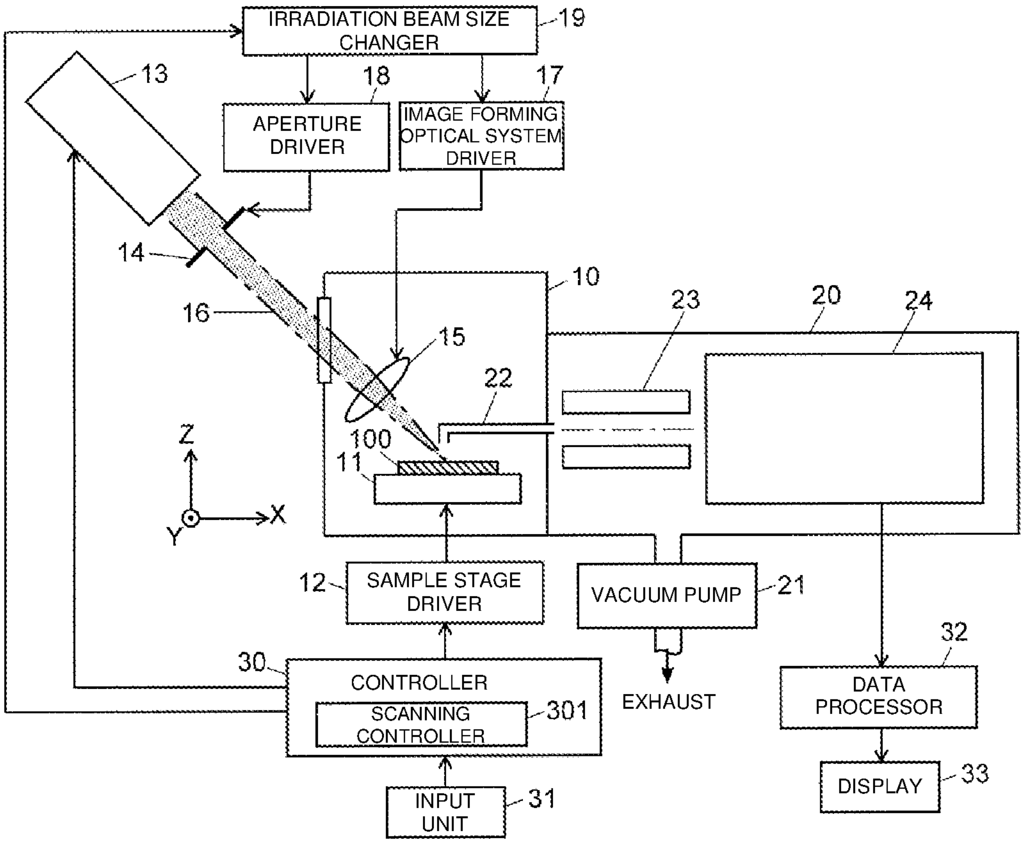
FIG. 1 is a schematic block diagram illustrating an imaging mass spectrometer according to a first embodiment of the present invention.

FIG. 1 is a schematic block diagram illustrating the imaging mass spectrometer of the first embodiment. In the imaging mass spectrometer of the first embodiment, an atmospheric pressure matrix assisted laser desorption ionization (AP-MALDI) method or an atmospheric pressure laser desorption ionization (AP-LDI) method is adopted as an ionization method.

In the imaging mass spectrometer, ionization is performed in an ionization chamber 10 maintained in a substantially atmospheric pressure atmosphere, the ionization chamber 10 being different from a vacuum chamber 20 evacuated by a vacuum pump 21. In the ionization chamber 10, a sample 100 that is an analysis target is placed on a sample stage 11, which is movable in three axial directions of an X-axis, a Y-axis, and a Z-axis orthogonal to one another by driving force from a sample stage driver 12 including a motor. For example, the sample 100 is a tissue section cut out very thin from a living tissue, and is prepared as a sample for MALDI by applying or spraying a proper matrix sample onto the sample 100.

A laser beam 16 for ionizing the substance in the sample 100 is emitted from a laser emitter 13, and passes through an aperture member 14 and an image forming optical system 15, and a surface of the sample 100 is irradiated with the laser beam 16. Under an instruction of an irradiation beam size changer 19, the aperture member 14 is movable within a predetermined range in an optical axis direction of the laser beam 16 by an aperture driver 18, and the image forming optical system 15 is movable in a predetermined range in the optical axis direction of the laser beam 16 by an image forming optical system driver 17. A controller 30 includes a scanning controller (corresponding to the position controller of the present invention) 301 that appropriately moves the sample stage 11 in an X-Y plane in response to an instruction from an input unit 31. When a scanning controller 301 moves the sample stage 11 in the X-Y plane using the sample stage driver 12, a position where the laser beam is emitted is moved on e sample 100. Consequently, a laser beam irradiation position is scanned on the sample 100.

An entrance end of an ion transport pipe 22 that communicates the ionization chamber 10 and the vacuum chamber 20 is open just above the laser beam irradiation position of the sample 100. An ion transport optical system 23 and an ion separation and detection unit 24 are installed in the vacuum chamber 20. The ion transport optical system 23 transports ions while converging the ions by action of an electric field. The ion separation and detection unit 24 includes a mass spectrometer that separates the ions according to a mass-to-charge ratio and a detector that detects the separated ions.

For example, an electrostatic electromagnetic lens, a multipole type high-frequency ion guide, or a combination thereof is used as the ion transport optical system 23. For example, a quadrupole mass filter, a linear ion trap, a three-dimensional quadrupole ion trap, an orthogonal acceleration time-of-flight mass spectrometer, a Fourier transform ion cyclotron mass spectrometer, or a magnetic field sector type mass spectrometer is used as the mass spectrometer of the ion separation and detection unit 24. A detection signal is sent from the ion separation and detection unit 24 to a data processor 32, the data processor 32 performs predetermined data processing, and a processing result is output from a display 33. Components disposed in the vacuum chamber 20 are simplified because they are not a purpose of the present invention. However, actually an inside of the vacuum chamber 20 is constructed with a multi-stage differential evacuation system, and the appropriate ion transport optical system 23 is provided in each of intermediate vacuum chambers having different degrees of vacuum.

Figure 2A:
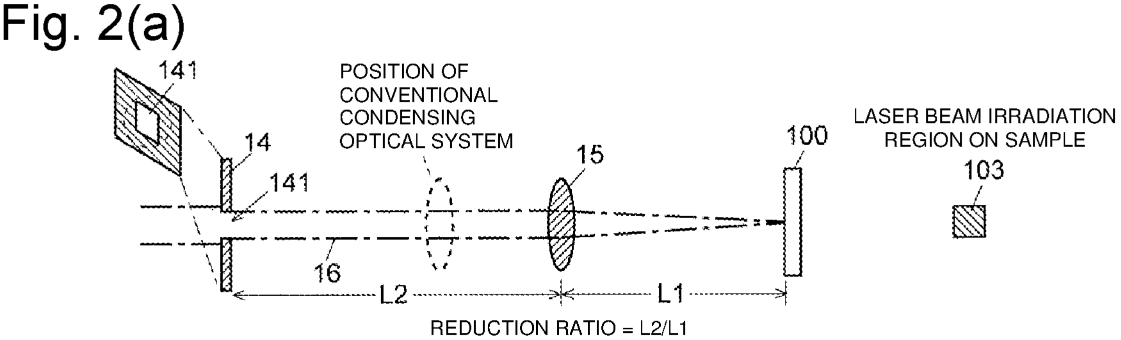
FIGS. 2(*a*) and 2(*b*) are schematic diagrams illustrating a laser optical system of an ion source in the imaging mass spectrometer of the first embodiment.
Figure 2B:
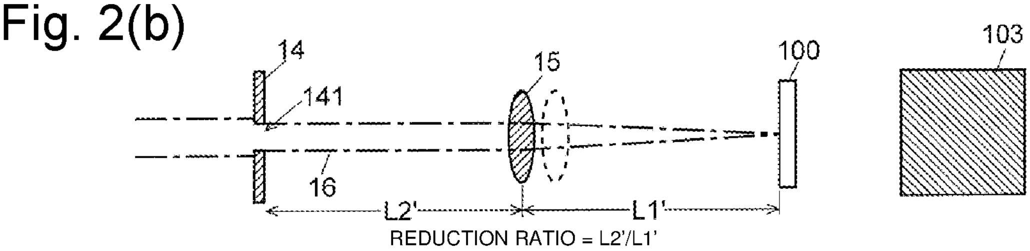

One of the features of the mass spectrometer of the first embodiment is a configuration of the laser beam optical system that irradiates the sample 100 with a laser beam for the purpose of ionization. FIGS. 2(*a*) and 2(*b*) are schematic diagrams of the laser beam optical system, and illustrates an optical path until the laser beam 16 emitted from the laser emitter 13 reaches the sample 100.

Normally, in a conventional mass spectrometer, the laser beam is condensed by a condensing optical system (different from an image forming optical system that reduces and projects an object placed in front of an optical system onto a predetermined plane) inserted between the laser emitter and the sample, and the respective optical systems and the sample are disposed such that the surface of the sample 100 comes to a position where the laser beam is most condensed, that is, a position where a spot diameter of the laser beam is minimized. In that case, the spot diameter on the sample becomes a diffraction limit size decided from a light flux diameter of the pre-condensing laser beam and the focal position of the condensing optical system, and a shape of the laser beam irradiation region ideally becomes a circle in the case that sample is orthogonally irradiated with the laser beam (in the case that an optical axis of the laser beam is orthogonal to the sample). In the case that the optical axis of the laser beam is inclined with respect to the normal line of the sample surface like the configuration in FIG. 1, the shape of the laser beam irradiation region becomes elliptical.

On the other hand, in the mass spectrometer of the first embodiment, as illustrated in FIG. 2(*a*), the aperture member 14 in which an opening (aperture) 141 having a predetermined shape is formed is inserted in the optical path of the laser beam 16 such that the laser beam irradiation region on the sample 100 becomes a square shape, and the image forming optical system 15 is disposed between the aperture member 14 and the sample 100. At this point, in order to form a square-shaped laser beam irradiation region having approximately the same size as the originally circular-shaped or elliptical-shaped laser beam irradiation region on the sample 100, conventionally the diffraction limit is decreased by disposing the image forming optical system 15 at a position closer to the sample than the condensing optical system inserted at a position indicated by the dotted line in FIG. 2(*a*). The aperture member 14 is disposed at a proper position such that an opening shape of the aperture member 14 is formed on the surface of the sample 100, and a focal length of the image forming optical system 15 is selected. A relationship of 1/L1+/L2=1/f holds among a distance L1 between the surface of the sample 100 and the image forming optical system 15, a distance L2 between the image forming optical system 15 and the aperture member 14, and a focal length f of the image forming optical system 15. A reduction ratio of the image formation on the sample 100 is L2/L1.

When the optical axis of the laser beam is orthogonal to the surface of the sample 100, an opening 141 has a square shape. On the other hand, like the configuration example in FIG. 1, when the optical axis of the laser beam is inclined with respect to the normal line of the surface of the sample 100, the opening 141 may have a trapezoid shape that is distorted according to the inclination. Consequently, a laser beam irradiation region 103, in which the projection shape of the laser beam onto the surface of the sample 100 is square and the size of the projection shape is substantially the same as that of the conventional circular-shaped or elliptical-shaped laser beam spot, is formed on the sample 100. In principle, such a configuration is the same as a configuration in which a predetermined mask pattern is reduced and projected onto a surface of a workpiece in a laser processing machine or the like.

As is well known, the square is a representative graphical shape with which complete plane tiling can be achieved. The reason the laser beam irradiation region has the square shape is that the size in the X-axis direction is equal to the size in the Y-axis direction, and that the sample stage 11 is moved only by the same amounts in both the X-axis direction and the Y-axis direction (the sizes in the X-axis direction and the Y-axis direction of the laser beam irradiation region 103) without rotating the sample stage 11 in the case that regions that are adjacent to each other are irradiated with the laser beam so as to completely tile the plane. That is, the movement of the sample stage 11 for the complete plane tiling is easily controlled, and a moving time of the sample stage 11 can be shortened. This point will be described in more detail later.

As described above, basically the aperture member 14, the image forming optical system 15, and the sample 100 are disposed at positions where the image can be formed as small as possible by the image forming optical system 15. However, the aperture member 14 and the image forming optical system 15 are movable in the optical axis direction under the instruction of the irradiation beam size changer 19. Consequently, as illustrated in FIG. 2(*b*), when the distance between the image forming optical system 15 and the sample 100 is lengthened (distance: L1→L1') while the distance between the aperture ember 14 and the image forming optical system 15 is appropriately shortened (distance: L2 L2'), the reduction rate can be reduced while an image forming condition is kept on the sample 100. That is, the irradiation beam size changer 19 moves the aperture member 14 and the image forming optical system 15 using the aperture driver 18 and the image forming optical system driver 17, respectively, which allows adjustment of the size of the laser beam irradiation region 103 having substantially square shape on the sample 100.

The imaging mass spectrometer of the first embodiment specifically performs mass spectrometry in an analysis target region 101 on the sample 100 as follows. A user sets the analysis target region 101 on the sample 100 through the input unit 31, and a unit attention region 102 is decided by designating spatial resolution and the like in the analysis target region 101. At this point, the controller 30 decides the size of the laser beam irradiation region and step widths in the X-axis direction and the Y-axis direction in moving the laser beam irradiation position. Normally, the size of the laser beam irradiation region and the step widths are matched with the size of the unit attention region 102. FIGS. 3(*a*) to 3(*c*) are schematic diagrams illustrating a relationship between the unit attention region 102 and the laser beam irradiation region 103 in the analysis target region 101. FIGS. 3(*a*) and 3(*c*) illustrate examples in which the size of the laser beam irradiation region 103 is adjusted to the size of the unit attention region 102.

When the analysis is started, the irradiation beam size changer 19 instructed by the controller 30 adjusts the positions of the aperture member 14 and the image forming optical system 15 using the aperture driver 18 and the image forming optical system driver 17 such that the size of the laser beam irradiation region becomes a predetermined size. On the other hand, the scanning controller 301 adjusts the position of the sample stage 11 using the sample stage driver 12 such that the unit attention region 102 located at an upper left end in the analysis target region 101 in FIG. 3(*a*) is irradiated with the laser beam. Then, the laser emitter 13 is driven to irradiate the sample 100 with the laser beam in a pulsed manner, the mass spectrometry is performed on the ions accordingly generated from the sample 100, and the obtained data is stored in the data processor 32. Usually, the analysis is repeated by irradiating the same region (in this case, the unit attention region 102) with the laser beam a plurality of times, and the pieces of data obtained by the repetition is integrated to obtain a mass spectrometry result in the region.

When the mass spectrometry for a certain unit attention region 102 in the analysis target region 101 is completed, the scanning controller 301 controls the sample stage driver 12 to move the sample stage 11 to the next unit attention region 102. After moving, the sample 100 is irradiated with the laser beam in the same manner as described above, and the mass spectrometry is perforated on the unit attention region 102. In this way, the mass spectrometry is sequentially performed on each unit attention region 102 within the predetermined analysis target region 101, and mass spectrometry data of each unit attention region 102 is acquired. After completion of all the analyses, the data processor 32 collects signal intensity data of each unit attention region with respect to a specific mass-to-charge ratio designated through the input unit 31, and produces a mapping image (two-dimensional distribution image) of the mass-to-charge ratio, and displays the mapping image on the screen of the display 33 as a mass spectrometry image.

As is clear from comparison of FIGS. 3(*a*) and 3(*c*), assuming that the size of the analysis target region 101 is the same, the mass spectrometry image becomes coarse (that is, the spatial resolution is degraded) when the size of the unit attention region 102 is large. On the other hand, because the number of analyses can be decreased by that much when the size of the unit attention region 102 is large, the analysis time is shortened, and the mass spectrometry image can be obtained in a short time. An amount of data is small, so that a memory capacity for storing data can be decreased.

Even if the size of the unit attention region 102 is large, the mass spectrometry can be performed while the size of the laser beam irradiation region 103 is kept small. In this case, as illustrated in FIG. 3(*b*), a plurality of laser beam irradiation regions 103 having a small size are associated with one unit attention region 102. In this case, an analysis procedure itself is the same as that in FIG. 3(*a*), and the pieces of mass spectrometry data obtained in the plurality of laser beam irradiation regions 103 may be integrated in each unit attention region 102. In this method, necessity for changing the size of the laser beam irradiation region 103 is eliminated, so that a mechanism that changes the size of the laser beam irradiation region 103 can be omitted. However, the number of analysis times is large even if the unit attention region 102 is large, so that the analysis takes time.

Second Embodiment

In the imaging mass spectrometer of the first embodiment, the shape of the laser beam irradiation region is maintained even if the size of the laser beam irradiation region is changed. For this purpose, it is necessary to dispose the image forming optical system 15 at a position closer to the sample 100 than the position where the condensing optical system is disposed in the conventional apparatus. However, in the mass spectrometer, it is necessary to dispose components, such as the ion transport pipe 22 in FIG. 1 and an extraction electrode (not shown in FIG. 1) that forms a DC electric field in order to extract the ions from the vicinity of the sample 100, which collects the ions generated from the sample 100, close to the sample 100, and sometimes the image forming optical system 15 can hardly disposed close to the sample 100 due to space restriction. The imaging mass spectrometer of the second embodiment has a configuration corresponding to such cases.

The basic configuration of the entire apparatus is the same as that in FIG. 1, and the difference in the configuration of the laser optical system will be described with reference to FIG. 4(*a*) to FIG. 4(*c*). FIG. 4(*a*) is the same as FIG. 2(*a*), and FIGS. 4(*b*) and 4(*c*) are schematic diagrams illustrating the laser optical system in the imaging mass spectrometer of the second embodiment.

In the second embodiment, a condensing optical system 150 having the same focal length as that used in the conventional apparatus is used instead of the image forming optical system 15 of the first embodiment, and disposed at the same position (a position indicated by the dotted line in FIG. 4(*a*)) as the conventional apparatus. The aperture member 14 is disposed in the vicinity of the condensing optical system 150, usually at a position considerably close to the condensing optical system 150. In this case, the positional relationship among the aperture member 14, the condensing optical system 150, and the sample 100 and the focal length of the condensing optical system 150 do not satisfy the condition that forms the opening shape of the aperture member 14 on the sample 100. As a result, similarly to the conventional apparatus, the image of the shape of the opening 141 in the aperture member 14 is not formed on the sample 100, but the laser beam irradiation region on the sample 100 has a substantially circular or substantially elliptical shape as illustrated in FIG. 4(*b*).

At this point, when the condensing optical system 150 is moved in the optical axis direction so as to come close to the sample 100, the image formation is in a defocused state on the sample 100, and the laser beam irradiation region is enlarged. On the other hand, a contour shielded by the aperture member 14 appears gradually. As a result, when the condensing optical system 150 is brought close to the sample 100 to some extent or more, the shape of the opening 141 of the aperture member 14 is projected onto the sample 100. Consequently, as illustrated in FIG. 4(*c*), when the laser beam irradiation region 103 is enlarged, the shape of the laser beam irradiation region 103 becomes a square shape. That is, in the imaging mass spectrometer of the second embodiment, the shape of the laser beam irradiation region 103 becomes substantially circular when the laser beam irradiation region 103 is small, and the shape of the laser beam irradiation region 103 becomes square when the laser beam irradiation region 103 is enlarged. That is, as illustrated in FIG. 3(*c*), when the unit attention region 102 is large, the unit attention region 102 is substantially matched with the laser beam irradiation region 103, and the mass spectrometry is fully performed on the inside of the analysis target region 101.

In the imaging mass spectrometer of the second embodiment, for the small unit attention region 102, the imaging mass spectrometer of the second embodiment is not superior to the conventional apparatus because the laser beam irradiation region 103 has a circular shape or an elliptical shape. However, in the actual mass spectrometry imaging, it can be said that the imaging mass spectrometer of the second embodiment is advantageous for the laser beam irradiation region 103 having the square shape (the shape with which the complete plane tiling can be achieved) particularly for the large unit attention region 102. This point will be described with reference to FIG. 5.

When the wide substance distribution on a sample is roughly learned, frequently a large analysis target region is set and the unit attention region is enlarged according to the large analysis target region. Conversely, when the fine substance distribution is learned, frequently the unit attention region is reduced and the analysis target region is reduced according to the reduced unit attention region. This is because, when the number of unit attention regions in the analysis target region is too many, the obtained data amount becomes enormous or it takes an extremely long time to perform the analysis. That is, irrespective of the size of the analysis target region, the condition is decided such that the number of unit attention regions in the analysis target region is the same to some extent.

Figure 5:
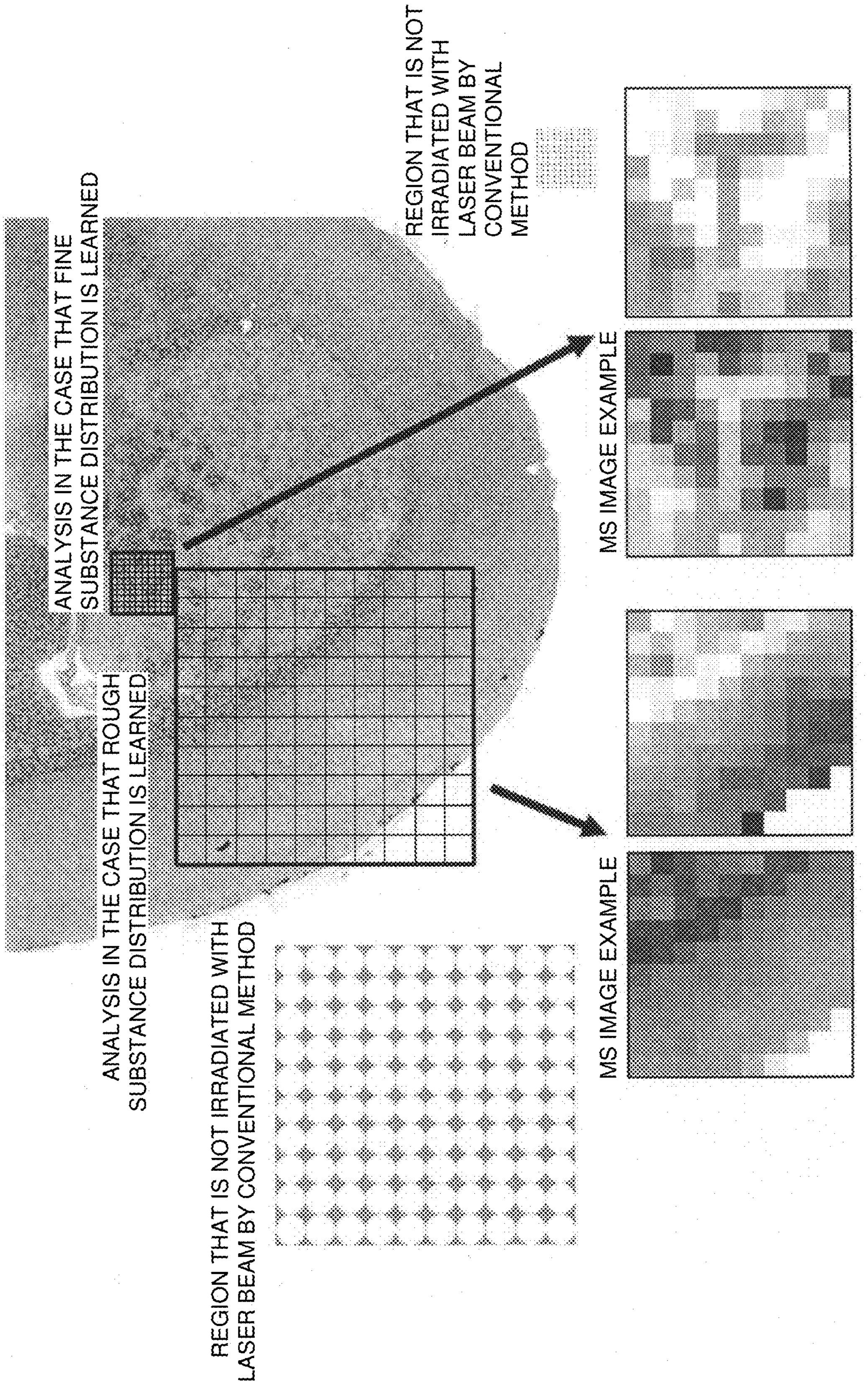
FIG. 5 is a view illustrating an analysis target region in learning a rough substance distribution on a sample and an analysis target region in learning a fine substance distribution, and an example of a mass analysis image obtained with respect to the analysis target region.

For the circular laser beam irradiation region in which the size is variable, when the size of the laser beam irradiation region is changed according to the size of the unit attention region, a proportion of the region (the non-ionized region 104) that is not irradiated with the laser beam remains unchanged irrespective of the size of the unit attention region. However, as illustrated in FIG. 5, the larger the unit attention region is, the larger a total area of the non-ionized region 104 increases. An increase in the total area of the non-ionized region 104 means an increase in a portion on the surface of the sample that is not used in the mass spectrometry, which leads to an increase in the detection omission of substances contained in the sample. According to the imaging mass spectrometer of the second embodiment, when the unit attention region is large, the shape of the laser irradiation region is substantially the same shape as the unit attention region, and almost all of the inside of the analysis target region 101 is subjected to the mass spectrometry, so that the effective use of the sample and reduction of the detection omission of the substance can be achieved.

As described above, the imaging mass spectrometer of the second embodiment can appropriately adjust the disposition of the aperture member 14 and the position of the condensing optical system using the condensing optical system normally used in the conventional apparatus, which allows the shape of the laser irradiation region to be formed into the rectangular substantially equal to that of the unit attention region similarly to the first embodiment when the unit attention region is large. It can be said that the imaging mass spectrometer of the second embodiment has a proper configuration from the viewpoint of ease of construction of hardware and practical use in terms of the effect.

Figure 6:
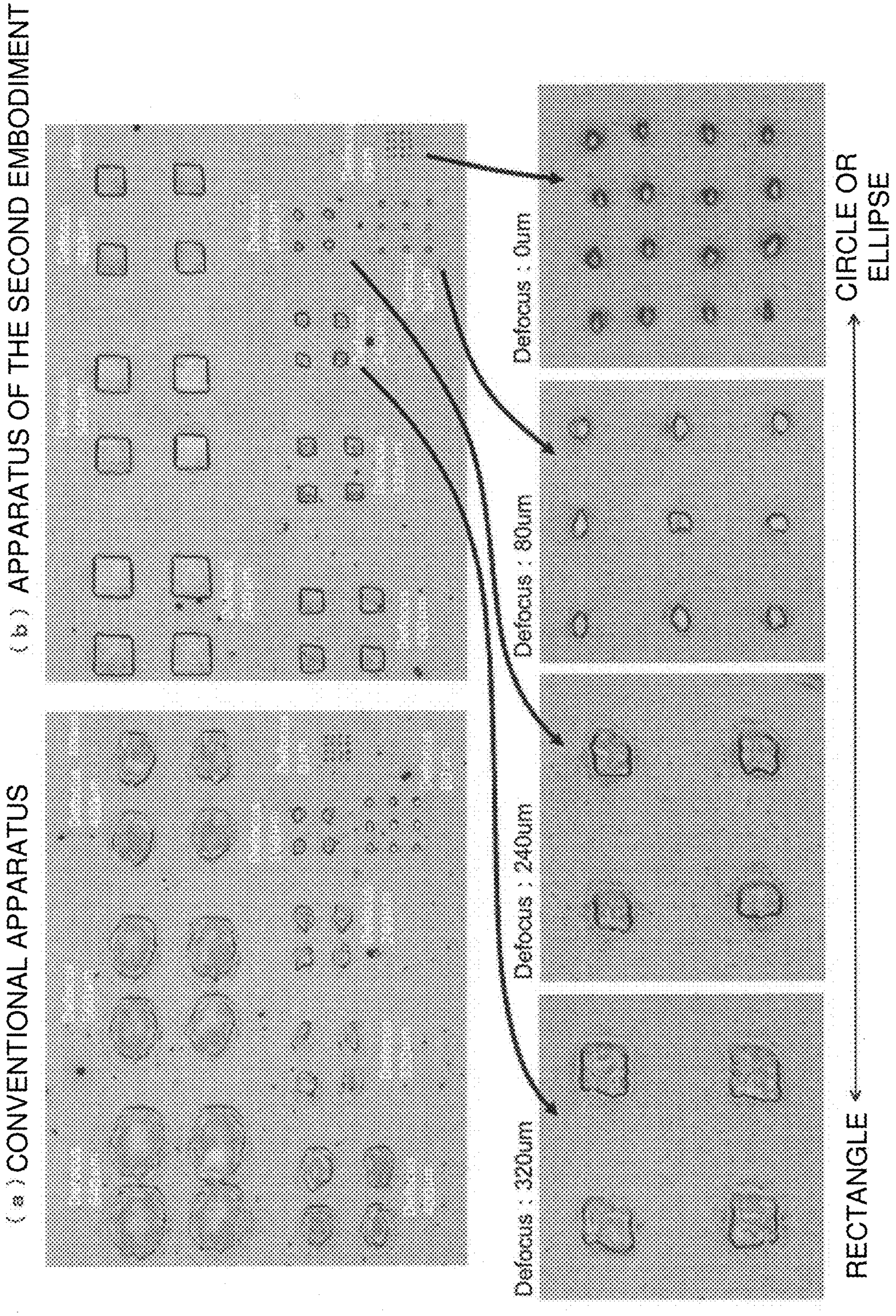
FIG. 6 illustrates an actual measurement example indicating a difference in laser beam irradiation region between the imaging mass spectrometer of the second embodiment and a conventional apparatus.

FIG. 6 is a view illustrating an actually-obtained measurement result of the laser irradiation region. At this point, an optical system that condenses the laser beam that is a Gaussian beam having a diameter of about 20 mm using a lens having a focal length of about 80 mm is used as the image forming optical system, and an aperture member having a bilaterally symmetric trapezoidal opening having an upper side of about 10 mm, a lower side of about 15 mm, and a height of about 10 mm is disposed on an incident side of the optical system. The reason why the shape of the opening is formed into the trapezoidal shape is that the laser beam irradiation region on the sample is formed into a substantially square shape in the optical system in which the sample is irradiated with the laser beam used in an experiment at an angle of about 45°, The sample is one in which dye is uniformly applied onto a surface of a slide glass, the dye is scattered by ablation in the region irradiated with the laser beam, and therefore the shape and size of the laser beam irradiation region can be observed with an optical microscope. The laser beam has a wavelength of 355 nm and a pulse width of about 10 nsec. The number of laser beam irradiation times per one place is 100.

FIG. 6(*a*) illustrates a change in the laser beam irradiation region when the laser beam is defocused on the sample by gradually moving the lens in the optical axis direction in the conventional apparatus (having a configuration in which the aperture member is not used). In this case, even if the defocused state is advanced, the laser irradiation region has a substantially elliptical shape, but is not substantially changed from the case that the laser beam is not defocused. On the other hand, FIG. 6(*b*) illustrates a change in the laser beam irradiation region when the laser beam is defocused on the sample by gradually moving the lens in the optical axis direction in the apparatus of the second embodiment. In this case, when the laser beam is not defocused, the laser irradiation region has substantially elliptical shape, and is substantially the same as the conventional apparatus. However, the shape of the laser irradiation region approaches a rectangle shape as the defocused state is advanced, and the rectangular laser irradiation region is gradually enlarged when a defocus amount is greater than or equal to 320 μm. In this experiment, the shape of the aperture is not necessarily optimized. However, the shape of the laser beam irradiation region on the sample can be formed into the square shape by optimizing the shape of the aperture in consideration of a spread angle of the laser beam and the like.

Modifications

In the first and second embodiments, the aperture shape is decided such that the shape of the laser irradiation region on the sample has the square shape. Alternatively, the shape of the laser irradiation region on the sample may be formed into any shape as long as the complete plane tiling can be achieved. A regular polygon in which the complete plane tiling can be achieved has three kinds of an equilateral triangle (see FIG. 7(*a*)), a square, and a regular hexagon (see FIG. 7(*b*)). Besides the regular polygons, the complete plane tiling can be achieved in a parallelogram, some triangle, a parallel hexagon, some square, or a figure deformed variously based on such figures. However, the graphical shape desirably satisfies the following conditions.

(1) The complete plane tiling can be achieved by parallel movement without rotation. When a rotation movement is required, for example, a mechanism that rotates the sample stage around the Z-axis is newly required, time for rotation movement is required, and the analysis time is prolonged.

(2) The planar filling can be performed by parallel movement in one of the X-axis direction and the Y-axis direction except for an end of the analysis target region. In a typical imaging mass spectrometer, because the unit attention regions are arranged in a grid pattern along the X-axis and the Y-axis, the laser irradiation region is easily associated with the unit attention region when the complete plane tiling is achieved by parallel movement in one of the X-axis direction and the Y-axis direction. Usually, in order to equalize the spatial resolution in the X-axis direction and the Y-axis direction, the sizes in the X-axis direction and the size in the Y-axis direction of the unit attention region are equal to each other. For this reason, more desirably moving distances in the X-axis direction and the Y-axis direction are equal to each other in the complete plane tiling.

(3) Each vertex should be in the graphical shape, each vertex is as close as possible to the center of gravity of the figure. As described in (2), usually the unit attention region has the same size in the X-axis direction and the Y-axis direction. For this reason, it is not preferable that an extremely convex shape, an extremely concave shape, or an elongated shape exists in order to properly perform the mass spectrometry on each unit attention region. When the distance from one end of the irradiation region to the other end is long even if the laser irradiation area is small, an ion generation range becomes wide, which leads to deterioration of sensitivity and deterioration of mass resolution. From this point of view, desirably the shape of the laser irradiation region is close to a circle.

Figure 7A:
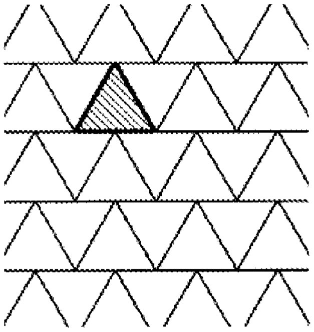
FIGS. 7(*a*) to 7(*c*) are diagrams illustrating another example of a shape of the laser beam irradiation region where complete plane tiling can be achieved.
Figure 7B:
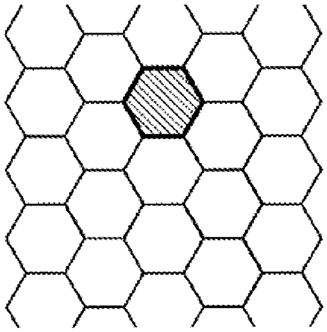
Figure 7C:
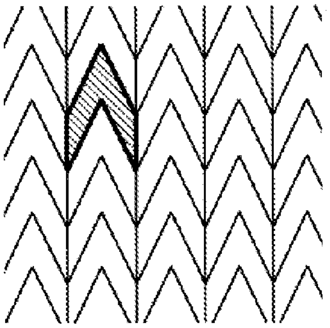
Figure 8A:
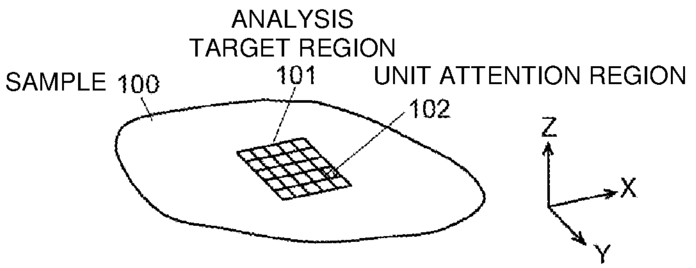
FIGS. 8(*a*) to 8(*e*) are schematic diagrams illustrating an example of association between the laser beam irradiation region having a substantially circular shape and a rectangular pixel on an image in a conventional imaging mass spectrometer.
Figure 8B:
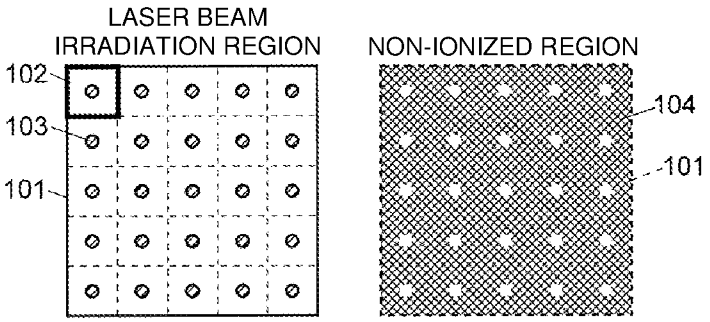
Figure 8C:
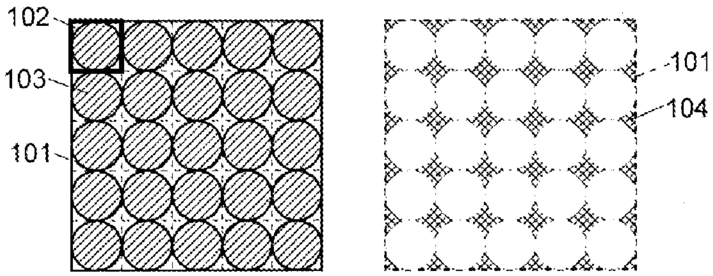
Figure 8D:
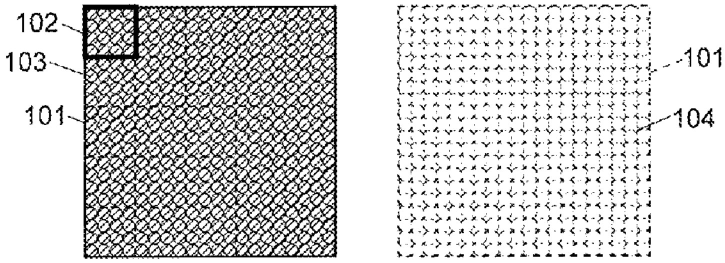
Figure 8E:
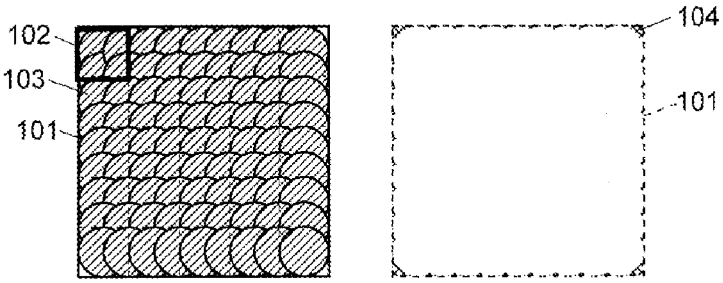
Figure 9:
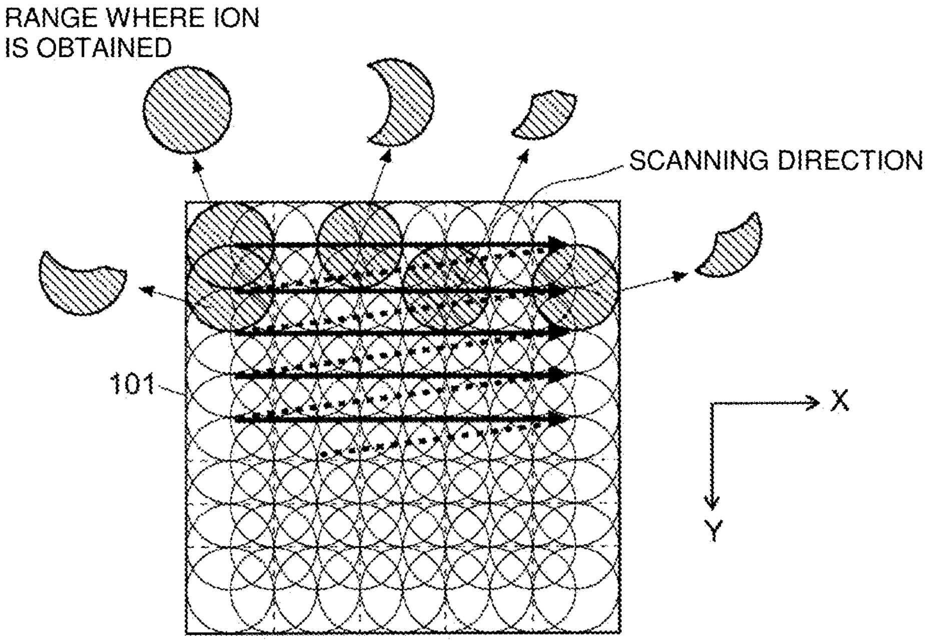
FIG. 9 is a diagram illustrating an example of a relationship between every laser beam irradiation position and a shape of a region where a sufficient amount of ions is generated.

For example, for the equilateral triangle in FIG. 7(*a*), although the conditions (2) and (3) are satisfied, the condition (1) is not satisfied. For the regular hexagon in FIG. 7(*b*), although the conditions (1) and (3) are satisfied, the condition (2) is not satisfied. For the parallel hexagon in FIG. 7(*c*), although the conditions (1) and (2) are satisfied, the condition (3) is not satisfied. The rectangle satisfies both of the conditions (1), (2), and (3), particularly the square is preferable. For this reason, in the above embodiments, the laser beam irradiation region is formed into the square shape.

In the above embodiments, the laser irradiation region having the predetermined shape is formed on the sample by the combination of the aperture member and the image forming optical system. However, a laser irradiation region having a similar shape can be formed even if another optical system is used. For example, a mirror having a predetermined shape is used instead of the aperture member, and the light flux in which the sectional shape is shaped by being reflected by the mirror may be formed on the sample by the image forming optical system.

In the above embodiments, the present invention is applied to the imaging mass spectrometer. However, the present invention is not necessarily limited to the apparatus that performs the imaging mass spectrometry. It is clear that the present invention is usefully applied to a mass spectrometer that acquires a mass spectrum, an $MS^n$ spectrum, and the like in association with each position in the two-dimensional analysis target region, and compares the mass spectra at different positions to each other or performs difference analysis thereof. The present invention is useful for an application in which a one-dimensional (that is, linear) graph indicating the signal intensity at a predetermined mass-to-charge ratio corresponding to each position is produced based on the mass spectrum acquired from each position in the one-dimensional analysis target region.

The present invention is applicable to not only a mass spectrometer in which the MALDI method or the LDI method is adopted, but also a mass spectrometer equipped with an ion source by an SALDI method or an ELDI method or LA-ICPMS and the like. In the MALDI, LDI, SALDI, and the like, the desorption and the ionization of the substance in the sample are generated substantially simultaneously by the irradiation of the sample with the laser beam. On the other hand, in the ELDI or the LA-ICPMS, there is a difference that only the desorption (vaporization) of the substance in the sample is generated by the laser beam irradiation while the ionization is performed in a separate process. However, in all these ionization methods, only the substance existing in the region on the sample irradiated with the laser beam is ionized and subjected to the mass spectrometry, and the analysis is performed position-selectively by the laser beam irradiation.

It should be understood that the above embodiments are merely examples of the present invention, and changes, modifications, and additions, which are appropriately made within the scope of the present invention, are also included in the scope of claims.

REFERENCE SIGNS LIST

10 . . . Ionization Chamber
100 . . . Sample
101 . . . Analysis Target Region
102 . . . Unit Attention Region

103 . . . Laser Beam Irradiation Region
104 . . . Non-Ionized Region
11 . . . Sample Stage
12 . . . Sample Stage Driver
13 . . . Laser Emitter
14 . . . Aperture Member
15 . . . Image Forming Optical System
150 . . . Condensing Optical System
16 . . . Laser Beam
17 . . . Image Forming Optical System Driver
18 . . . Aperture Driver
19 . . . Irradiation Beam Size Changer
20 . . . Vacuum Chamber
21 . . . Vacuum Pump
22 . . . Ion Transport Pipe
23 . . . Ion Transport Optical System
24 . . . Ion Separation and Detection Unit
30 . . . Controller
301 . . . Scanning Controller
31 . . . Input Unit
32 . . . Data Processor
33 . . . Display

The invention claimed is:

1. A mass spectrometer comprising an ion source that irradiates a sample with a laser beam to ionize a substance in the sample existing in a laser beam irradiation region, and preforming a mass spectrometry on ions generated by the ion source or ions derived from the ions generated by the ion source, the mass spectrometer further comprising;

a laser beam source that emits the laser beam;

a laser beam shaping unit that shapes the laser beam emitted from the laser beam source such that a sectional shape of the laser beam becomes a predetermined graphical shape with which a plane can be completely tiled, the predetermined graphical shape being a rectangular shape;

a size changer that changes a size of the laser beam, shaped by the laser beam shaping unit, with which the sample is irradiated; and a position controller that controls a relative positional relationship between the sample and the laser beam such that laser beam irradiation position on the sample moves, and controls the relative positional relationship between the sample and the laser beam such that the complete plane tiling is achieved by the laser beam irradiation region while the sectional shape of the laser beam becomes the predetermined shape and the sample is irradiated with the laser beam, wherein when the size changer changes the size of the laser beam to a larger size, a shape of the laser beam irradiation region becomes the rectangular shape.

2. The mass spectrometer according to claim 1, wherein the laser beam shaping unit includes an aperture member in which an opening having a predetermined shape is formed, the aperture member being provided on an optical axis of the laser beam emitted from the light source unit.

3. The mass spectrometer according to claim 2, wherein:

the size changer includes a condensing optical system provided between the aperture member and the sample on the optical axis of the laser beam so as to be movable along the optical axis, and a size and a shape of the laser beam irradiation region are both changed in accordance with a position of the condensing optical system.

4. The mass spectrometer according to claim 1, further comprising a data processor that produces a graph of a mass spectrometry result or a mass spectrometry image with respect to a predetermined one-dimensional or two-dimensional analysis target region based on the mass spectrometry result generated by mass spectrometry of ions, which are obtained by irradiating the sample with the laser beam while the position controller controls the relative positional relationship between the sample and the irradiation laser beam.

5. The mass spectrometer according to claim 1, wherein the ion source is an ion source by a matrix assisted laser desorption ionization method or a laser desorption ionization method.

* * * * *